United States Patent
Robinson

(10) Patent No.: US 7,656,995 B2
(45) Date of Patent: Feb. 2, 2010

(54) IMAGING OF MATERIALS

(75) Inventor: Max Robinson, Shincliffe (GB)

(73) Assignee: Durham Scientific Crystals Ltd., Glasgow (GB)

( * ) Notice: Subject to any disclaimer, the term of this patent is extended or adjusted under 35 U.S.C. 154(b) by 0 days.

(21) Appl. No.: 12/079,656

(22) Filed: Mar. 28, 2008

(65) Prior Publication Data

US 2008/0237480 A1    Oct. 2, 2008

(30) Foreign Application Priority Data

Mar. 29, 2007    (GB)    ................................ 0706088.2

(51) Int. Cl.
    *G03C 9/02*    (2006.01)
(52) U.S. Cl. .......................................... 378/41; 378/57
(58) Field of Classification Search ................ 378/41, 378/57, 62, 98.2, 98.12; 250/370.08, 370.09
    See application file for complete search history.

(56) References Cited

U.S. PATENT DOCUMENTS

| 5,313,511 | A | 5/1994 | Annis et al. | |
| 6,256,372 | B1 * | 7/2001 | Aufrichtig et al. | 378/41 |
| 7,362,847 | B2 | 4/2008 | Bijjani | 378/57 |
| 2003/0231739 | A1 | 12/2003 | Rosner | |
| 2006/0078085 | A1 * | 4/2006 | Zanker | 378/57 |

FOREIGN PATENT DOCUMENTS

| CN | 1979140 | 6/2007 |
| EP | 0 261 984 | 9/1987 |
| EP | 0 610 084 | 4/1998 |
| GB | 1 531 755 | 11/1978 |
| GB | 2 329 817 | 3/1999 |
| GB | 2 360 685 | 9/2001 |
| GB | 2 390 005 | 12/2003 |
| WO | WO 98/33063 | 7/1998 |
| WO | WO 2005/059594 | 6/2005 |
| WO | WO 2007/070580 | 6/2007 |

OTHER PUBLICATIONS

PCT Search Report for PCT/GB2008/001103, Oct. 17, 2008.
PCT Search Report for PCT/GB2008/001108, Oct. 13, 2008.

(Continued)

*Primary Examiner*—Courtney Thomas
(74) *Attorney, Agent, or Firm*—Drinker Biddle & Reath LLP

(57) ABSTRACT

An apparatus and method for obtaining an image of an object. The apparatus comprises a radiation source and a series of two to five linear detectors spaced therefrom to define a scanning zone; means to cause an object to move relative to and through the scanning zone; a direct image generation apparatus to generate an image from the output of a linear detector; an intermediate image generation apparatus configured to generate at least one intermediate image from an adjacent pair of linear detectors, by processing the output of the pair of detectors and generating an image representative of an output intermediate between the two said detector outputs; the image apparatus adapted such that at least five and preferably at least six images are generated in total; an image display adapted successively to display such images and thus display the monocular movement parallax between the images.

30 Claims, 3 Drawing Sheets

OTHER PUBLICATIONS

Multiple-view line-scan imaging, H.W. Hon and J.P.O. Evans; Optoelectronics, IEE Proceedings—vol. 149, Issue 2, Apr. 2002, pp. 45-50 Digital Object Identifier 10.1049/ip-opt:20020231.

Colour 3D X-Ray Imaging For Security Screening, Evans, J.P.O.; Wang, X; Chan, J.W.; Downes, D.; & Liu, Y; Crime and Security, Jun. 2006, pp. 372-377.

Kinetic depth effect X-ray (KDEX) imaging for security screening; Evans, J.P.O.; Visual Information Engineering, 2003. VIE 2003. International Conference on Jul. 7-9, 2003, pp. 69-72.

Depth from motion 3D X-ray imaging for security screening, Evans, J.P.O.; Liu, Y.; Chan, J.W.; Imaging for Crime Detection and Prevention, 2005. ICDP 2005. The IEE International Symposium on Jun. 7-8, 2005 pp. 5-8.

Stereoscopic imaging using folded linear dual-energy x-ray detectors, J.P.O. Evans, Institute of Physics Publishing Meas. Sci. Technol. 13 (2002), pp. 1388-1397.

Stereoscopic dual-energy X-ray imaging for target materials identification, T.W. Wang & J.P.O. Evans, IEE Proc.-Vis. Image Signal Process., vol. 150, No. 2, Apr. 2003, pp. 122-130.

* cited by examiner

IMAGING OF MATERIALS

FIELD OF THE INVENTION

This invention relates to a method and apparatus for detecting, imaging and in a preferred embodiment, characterising material in three-dimensional space.

The invention in particular relates to an apparatus and method making use of high energy radiation such as X-rays or gamma-rays to scan objects where it is desirable to gain information about their internal contents and/or composition. The invention in particular relates to an apparatus and method operating on the line-scan principle, in which three dimensional objects are caused to move through a scanning zone and imaging information collected. These principles are widely employed for example in the security industry, to scan objects where it is desirable to gain information about their internal contents, but might also be employed in other areas, for example, without limitation, medical imaging, imaging for quality control purposes or the purposes of determining the integrity of the structure, or the like.

BACKGROUND

Imaging apparatus which employs the line-scan principle is well known. Typically, such apparatus will consist of a high energy radiation source such as an X-ray source, and for the purpose of exemplification herein further discussion will describe X-ray systems in particular. The beam of the source may be collimated into a curtain, usually referred to as a "curtain beam", and is then detected by a linear array detector for example comprising a linear photodiode array. Image information is obtained by having the object of interest move linearly for example at right angles with respect to the beam and storing successive scans of X-ray transmission information derived from the linear array from which a complete image frame can be compiled.

If the object being scanned is heterogeneously transmissive of x-ray radiation, and for example consists of or contains multiple smaller objects and/or components of dissimilar materials, it can be possible to build up an image of the object, and in a particular case of the contents or components. The image may then be displayed on a viewing screen. This image can be useful for example in relation to the possible applications outlined above. In particular, it can be useful in determining the contents of a container or the internal structure of an object or body.

Even so, the image generated by such an X-ray apparatus is limited. At best it constitutes a two dimensional shadowgraph of the object being imaged. This can make it difficult to interpret.

European Patent No. 610084 describes a method of creating a "2.5D" solid model picture for viewing. A stereoscopic pair of X-ray images is obtained using two diverging curtain beams derived from an X-ray source. These are separated into conjugate slices and the 2.5D image built up from the resulting slice information.

The resultant image is not strictly a three dimensional image (although it is often so referred to) since it is presented on a two dimensional screen rather than by means of full stereoscopic apparatus. Such a 2.5D representation in fact contains psychological cues to depth such as linear perspective, interposition, shading and shadowing rather than the full physiological depth cue known as binocular parallax or stereoscopy which is required for a full three dimensional image.

The method of EP610084 still provides a user with a final image which can be rotated and looked at from different directions and which can give considerable information as to the relative positioning of different objects or compounds. However it does not give information as to the nature of the items which have been located.

UK Patent Nos. 2329817 and 2360685 are examples of methods and systems which can be used to produce full stereoscopic image pairs. They derive ultimately from principles set out in EP0261984. In particular they are subject to the condition set out at column 4 lines 31 to 48 therein which imposes considerable constraints on detector and source beam geometry. Although stereoscopic imaging can be a relatively powerful technique, exploiting full physiological cues in relation to depth information, and thus offering the potential for a user of the X-ray apparatus to identify objects or components much more readily and clearly, it can be complex in practical operation. To exploit the stereoscopic effect, it is necessary for the observer to receive different images at each eye simultaneously. This will necessitate the use of special apparatus. Moreover, a full stereoscopic technique requires precise control of the image collection process having regard to the conditions identified above. If the stereoscopic pair is to be effective, the respective images must be collected with a parallax that closely approximates to that which would be tolerated by the observer's eyes. For these reasons, full stereoscopic imaging has not gained wide acceptance for scanning machines of this type.

Not only do conventional non-stereoscopic apparatus and methods tend to give limited information in a third dimension, but also the images they produce also give limited information about the material content. In essence, at its simplest, all that is being measured is X-ray transmissivity.

In most practical systems even this is measured indirectly. At its simplest, a typical linear array detector comprises in combination a scintillator material responsive to transmitted X-rays, which is then caused to emit lower frequency radiation, and for example light in or around the visible region, in combination with a semiconductor detector such as a silicon or gallium arsenide based detector which is responsive to this lower frequency radiation. The detector merely collects amplitude information, and does not discriminate spectroscopically.

However, it is known that spectroscopic information from the transmitted X-rays could be used to give additional information about the material content of the objects or components being scanned. This has led to development of dual band detectors, which are capable of separately identifying low and high energy bands from the full spectrum of X-ray emissions. Such a dual energy sensor typically comprises a sandwich pair of semiconductor photodiode arrays or the like, in conjunction with a scintillator configuration that is configured such that the respective detectors detect transmission of low-energy and high- energy X-rays. It is known that the X-ray absorption properties of any material can vary spectroscopically, and that the amount by which the absorption properties vary depends in particular on atomic number. This is exploited by the dual energy detector to differentiate generally between objects having lower and higher atomic number elements predominating.

When exploited as part of a security or material identification system, a very crude approximation can be made that organic materials tend to be in the former category and most inorganic materials in the latter category. However, even such a system confers only limited information about composition. The organic/inorganic division is crude and approximate, can readily be confused by objects which are superimposed in the X-ray path, and will give no information concerning the crystalline or polycrystalline nature of an object.

UK Patent Nos. 2329817 and 2360685 incorporate dual-energy transmission detectors. Even so, the compositional information given by the arrangement is still limited, for example in that the low/higher energy duality effect can give only a crude approximation of an organic/inorganic split and cannot itself distinguish polycrystalline materials.

For this reason, the references include additional scatter detectors. X-rays are scattered by the materials they pass through and these scattered signals can contain information that may be used to identify the scattering materials. There is great applicability for these detectors as many of the materials that raise security issues, such as explosives, drugs and semiconductor materials, have a polycrystalline structure and therefore produce good scatter signals. This technique of identifying materials from the scattered signal though possible is not currently commercially used as the extra scatter detectors introduce greater complexity in the system and the scattered beams are weak and so throughput is limited.

The line-scan X-ray technique is widely used in security applications where the detection and differentiation of objects of complex and varied shape and composition is an important feature. A better resolution of the exact shape and location of such objects in three-dimensional space would be a considerable improvement on present techniques, especially if composition could also better be characterised.

SUMMARY OF THE INVENTION

It is an object of the present invention to mitigate some or all of the above disadvantages of prior art line scanning systems.

It is a particular object of the present invention to provide a method and apparatus for line scanning of objects, and especially of containers of multiple objects or objects comprising multiple components, which provides additional information about their shape and/or location in three-dimensional space.

It is a particular object of the invention to provide a method and apparatus which generates an image providing information about the shape and/or location of objects in three dimensional space which does not require special viewing apparatus but can be presented effectively on a two dimensional viewing screen.

Therefore, according to one aspect of the invention there is provided an apparatus for generating and displaying an image of an object comprising:

a high energy radiation source such as an X-ray or gamma-ray source and a series of at least two and no more than five linear radiation detectors such as, as applicable, X-ray or gamma-ray detectors spaced therefrom to define a scanning zone therebetween;

means to cause an object to move relative to and through the scanning zone in use;

a direct image generation apparatus configured to generate an image from the output of at least one and preferably each linear detector;

an intermediate image generation apparatus configured to generate at least one intermediate image from at least one and preferably each adjacent pair of linear detectors, by processing the output of the or each said pair of detectors and generating an image representative of an output intermediate between the two said detector outputs;

the image generation apparatus being adapted such that at least five and preferably at least six images are generated in total;

an image display adapted successively to display such images and thus display the monocular movement parallax between the images.

By analogy, in accordance with a further aspect of the invention there is provided a method of obtaining an image of an object comprising the steps of:

providing a high energy radiation source such as an X-ray or gamma-ray source and a series of at least two and no more than five linear radiation detectors such as, as applicable, X-ray or gamma-ray detectors spaced therefrom to define a scanning zone therebetween;

causing an object to move relative to and through the scanning zone; generating a direct image from the output of at least one and preferably each linear detector;

generating at least one intermediate image from at least one and preferably each adjacent pair of linear detectors, by processing the output of the or each said pair of detectors and generating an image representative of an output intermediate between the two said detector outputs;

such that at least five and preferably six direct and intermediate images are generated in total;

displaying such images successively and thus displaying the monocular movement parallax between the images.

Thus, in accordance with the method and apparatus of the first and second aspects of the invention successive images are generated as relative movement is effected between an object and a source/detector arrangement. Suitable means are provided to effect relative movement of object and scanning zone, for example comprising an object handler. It may often be convenient for an object to be moved, for example by a suitable object handler or conveyor, through a static scanning zone, but it will be appreciated that it is also valid to have the object remain static and to translate the detector and source to create the relative movement.

At least five and preferably at least six images (direct and intermediate) are generated from at least one spaced pair of linear X-ray or other radiation detectors successively reflecting movement of an object relative to a scanning zone. However, although a plurality of images is generated, the images are not simply collected and displayed as paired images with the intention of providing a stereoscopic effect. Rather, the invention exploits the monocular movement parallax between the successive images.

This parallax can give some effective physiological cues in relation to objects located in three-dimensional space, in particular if a successive multiple series of images is used, although the effect will be present for any pair of images. However, it has a number of advantages of simplicity over a full stereoscopic system.

In particular, the images are displayed successively as individual two-dimensional images, and require no special apparatus. The system exploits a monocular parallax. It is not necessary simultaneously to generate different images for each eye of a user as would be the case for stereoscopic viewing. A binocular or other complex stereoscopic viewing apparatus is not required. A simple monocular display is sufficient. Moreover, the relatively strict control of image production which is necessary to exploit binocular parallax effectively does not apply. For example for an effective binocular parallax pair of images, the images need to be generated in such a way that the parallax between them closely matches that which can be tolerated by a human observer. By contrast, an effective monocular parallax illusion of movement in three dimensions can be produced by a much greater range of successive images. It is not necessary to comply with the narrow conditions for beam geometry that apply to stereoscopic imaging in the prior art as set out numerically as noted above in EP0261984. The technique is thus potentially much more robust in practice.

The method and system in accordance with the first and second aspects of the invention are thus potentially simpler in many practical circumstances than a binocular method and apparatus, and, significantly, the invention tends to lend itself more closely to application with limited modification to existing apparatus and techniques. For example in the security field where X-ray line scanning using linear arrays of X-ray detectors is widely used, images produced in accordance with the method of the invention can be displayed on a two dimensional video display screen and information can be obtained from such images by a user seated at such a screen in an essentially conventional manner.

The monocular parallax effect is present in theory in just a pair of images, and visual cues in a third dimension which enable a user to resolve objects, and in particular individual contents and/or components thereof, being scanned can be obtained from such a simple pair of images. However, the effect is enhanced, and in particular a more effective impression of movement in three dimensions can be obtained, if a series of at least five and preferably at least six successive images is generated and displayed. In accordance with the invention, at least five and preferably at least six images are generated.

There are two ways in which additional images can be generated. First, there may be provided a laterally spaced series of more than two linear X-ray or other radiation detectors, for example at least three detectors. The output of each such detector may then be used singly to generate an image representative of data collected at the detector. However, a large number of linear detectors is not necessarily desirable and may require more complex apparatus.

In accordance with the invention therefore, further images are generated by interpolation of pairs of images collected from adjacent linear detectors. Thus, in accordance with the invention, the method comprises generating at least one intermediate image from at least one of and preferably a plurality of and for example each adjacent pair of linear detectors, by processing the output of the or each said pair of detectors and generating an image representative of an output intermediate between the two said detected outputs. The apparatus of the invention includes an intermediate image generator comprising a means having this functionality.

Sufficient intermediate images are generated to create at least five and preferably at least six images in total (that is, when direct images collected from the direct detected output of each detector and intermediate images generated by interpolation are summed) from no more than five detectors, and such that in any event more images are generated than there are detectors. Where only two or three detectors are used additional images are created by synthesising more than one virtually spaced intermediate images between sufficient pair of detectors to result in the required number of images. The intermediate image generator is then configured to generate two or more intermediate images from at least one adjacent pair which show a gradual transition between the images produced by each adjacent pair by processing the output of the or each said pair of detectors and generating image representatives of a transition between the two said detected outputs.

Thus an apparatus of the invention generates at least five and preferably at least six images, which is viewed as an effective minimum for optimum resolution of the parallax effect by a human viewer, but in all cases with fewer than six linear detector arrays and preferably in all cases producing more images than there are detector arrays. Sufficient visual information is generated from a simplified apparatus.

Where a single intermediate image is generated between an adjacent pair of detected images, the intermediate image preferably extrapolates image points on the intermediate image to a mid-point between equivalent image points on the two detected images. Where a plurality of intermediate images is provided between a pair of detected images these are preferably based on a similar, evenly spaced extrapolation. Further preferably, the relative spacing of detectors and the configuration of intermediate image generation is such that all images are generated with approximately the same relative movement spacing. For example detectors are evenly spaced and the same number of intermediate images is generated between each pair of a plural array.

In accordance with the foregoing, both the direct and the indirect approach are used to generate a series of images of an object in a scanning zone in what amounts, in effect, to different positions. In the first approach, a plurality of spaced detectors produce a corresponding plurality of direct images. In the second approach, actual data from adjacent linear detectors is used to generate an indirect image intermediate to the direct images, and thus representative of an intermediate object position.

Both methods are used to generate a successive series of images from which, by means of the monocular movement parallax between each pair of successive images, information about a third dimension, and in particular an impression of movement through a third dimension, can be obtained. A relatively small number of images is required to produce an effective animation-like movement in three dimensions by a user observing a simple two-dimensional screen.

In accordance with the invention at least five and preferably at least six images are generated but, as a result of use of the interpolation method to generate at least one indirect image from the output of each pair of detectors five or fewer detectors are required.

Where a plural series of laterally spaced linear detectors is provided, the space in between them is preferably generally constant, for example in that each pair of adjacent linear detectors in the series is substantially equally laterally spaced and/or at a substantially equal angular spacing relative to the X-ray or other radiation source.

The linear X-ray or other radiation detectors making up the laterally spaced series are preferably generally parallel. They may be disposed in a common plane or along a common arc. Each linear detector may be of any suitable configuration, for example of a conventional simple or folded configuration.

Preferably the linear detectors making up the laterally spaced series are arranged such that the distance between them changes in order to maintain a constant angular separation between each array. This is of critical importance for L-shaped detectors which are commonly found in many scanning industries. This innovation is also of critical importance when the source of the radiation is not positioned at the central point of each array.

Preferably the apparatus comprises alignment means 4 to allow for precise alignment of each linear detector as above described.

Preferably the apparatus comprises means to deliver plural beams, preferably from a single radiation source. For example a beam is directed at each linear detector. Preferably the means to deliver plural beams allows a user to select any of two to five beams as the case may be. Conveniently the apparatus comprises a collimator adapted to allow a user to select two to five beams from a single radiation source.

Conveniently, the successive images are displayed under observer control, for example in that control means are provided to enable a user to display successive images under control, and for example at a chosen speed and/or in a forward and reverse order on the image display means, so as to create an effective manipulation of third dimensional cues from the image series. For example this allows a user to display successive images at variable speeds in order to enable a smooth transition for the human observer between each image and/or to run the images in a forward and reverse order. In accordance with the method of the invention the successive images are thus displayed at custom definable refresh rates and directions under observer control to facilitate interpretation The display means is conveniently a simple two dimensional display screen, for example a conventional video display screen (which term is intended to encompass any direct display or projection system exploiting any cathode ray tube, plasma display, liquid crystal display, liquid crystal on silicon display, light emitting diode display or like technology). It is a particular advantage that the method can be envisaged for use with, and the apparatus for the invention incorporated into, the standard display screens of comparable existing systems for example in the security and medical imaging fields.

The X-ray or other radiation source is in particular preferably a curtain beam source as will be familiar from conventional line scan apparatus. The source may comprise a single primary source adapted to generate a series of beams such as curtain beams aligned to be incident upon each linear detector in the laterally spaced serial array at a suitable angular separation, from example by a suitable beam splitting apparatus. Alternatively, multiple sources may be provided each generating a beam such as a curtain beam incident upon a linear detector in the serial array. The source may comprise a source combining both of the foregoing principles.

Each linear detector in the laterally spaced series is a detector for the detection of transmitted X-rays or other radiation. For example, each detector is adapted to generate an electrical impulse in response to transmitted X-rays or other radiation, thus enabling data to be collected from which an image can be constructed as an object is caused to move through the scanning zone. Each detector conveniently exhibits a photoelectric response and may for example comprise a linear array of photodiode cells. The detector/cell may comprise a material directly and inherently capable of generating such an electrical response to incident X-rays or other radiation, or may comprise a combination of materials to generate such an electrical response indirectly, for example comprising a scintillator layer generating lower frequency electromagnetic radiation in response to incident X-rays or other radiation, and a material generating an electrical signal in response to such lower frequency incident electromagnetic radiation.

A conventional simple linear detector is of this latter type. A sandwich layer comprising a scintillator material, which generates photons generally in or in the vicinity of the visible region from incident X-rays, and a semiconductor layer, typically based on silicon or gallium arsenide, which generates an electrical signal via a photoelectric effect from the incident visible light, is used. Thus, the detector materials together generate an electrical impulse representative of transmitted X-rays incident upon the sandwich, and from which an image can be built as above described.

Successive images, even using a simple detector of this type, can be used in accordance with the method or apparatus of the invention to generate potentially significant third-dimensional cues which can significantly enhance the user resolvability of the resultant images, and in particular enhance the information which can be obtained in relation to multiple objects, or to an object having multiple contents or components. However, no compositional information is given.

In an alternative embodiment at least some of the linear detectors comprise dual energy detectors. This term is used herein to refer to detectors which can differentiate between low- and high-energy X-rays. The dual energy X-ray transmission part of the composite detector could be based on scintillator materials and photodiodes for example by comprising a sandwich structure of scintillators and semiconductor materials as above described, or could be based on scintillators in conjunction with optical fibres. In each case the emitted X-ray spectrum is filtered into high- and low-energy regions, and thus provides some compositional information based on atomic number (which to a crude approximation can differentiate to some extent between organic and inorganic materials).

If each X-ray image obtained is detected by a dual energy sensor as an object being examined is moved through the scanning zone, the dual energy sensor provides information about the nature of the object. This can further assist, in combination with the three dimensional cues which are provided by the monocular movement parallax between successive images, to assist in resolution of multiple objects or components, particularly those which are superimposed in an individual two-dimensional image.

However, it must be emphasised that conventional scintillator-semiconductor detectors do not give any real spectroscopic information about the spectrum of transmitted X-rays. These simple detectors merely detect the presence or otherwise of transmitted X-rays. Even the dual energy detectors ultimately operate on the same principle, although they detect the presence or otherwise of X-rays within two distinct bands of the spectrum.

In accordance with a particularly preferred embodiment of the apparatus invention therefore, at least some of the linear detectors in the series comprise detectors that can generate spectroscopic information about the transmitted X-rays or other radiation. That is, the detector exhibits a spectroscopically variable response across at least a substantial part of the X-ray or other radiation source spectrum allowing spectroscopic information to be retrieved.

Proper resolution of spectroscopic information confers two advantages. It offers the potential directly to characterise the composition of different components or objects, or parts of the image, and by distinguishing between objects, components or parts of different composition, for example by representing them differently (such as in different colours) in the resultant image, it assists in resolution of different objects, components or parts of the image.

Correspondingly in accordance with a preferred embodiment of the method, collected transmission data is resolved spectroscopically.

In accordance with this preferred embodiment, spectroscopic resolution of transmitted X-rays or other radiation obtained from the output of each such linear detector is represented in the generated image. For example, spectroscopic differentiation in the collected data is represented in the image as differentiated colour, shading or marking. For example, a functional mapping is created between the spectroscopic information collected by the detector and the visual spectrum, and a coloured image display derived according to this functional relationship. Alternatively, a banded mapping is used in that the spectrum is divided into a plurality of bands, for example between four and eight bands, and different colours are used to represent each such band in the displayed image. The apparatus conveniently includes suitable image processing means to effect this mapping.

It is necessary that the detector system is enabled to detect radiation in a manner which is spectroscopically resolvable by the data processing apparatus. Preferably, a linear detector system in accordance with the invention, or some or all discrete detector elements making up a multi-element detector system in accordance with the invention, may be inherently adapted to produce spectroscopic resolution in that it exhibits a direct spectroscopic response. In particular a system or element is fabricated from a material selected to exhibit inherently as a direct material property a direct variable electrical and for example photoelectric response to different parts of the source spectrum. For example, the detector system or element comprises a wide direct bandgap semiconductor material. For example, the detector system or element comprises a semiconductor material or materials preferably formed as a bulk crystal, and for example as a bulk single crystal (where bulk crystal in this context indicates a thickness of at least 500 µm, and preferably of at least 1 mm). The materials making up the semiconductor are preferably selected from cadmium telluride, cadmium zinc telluride (CZT), cadmium manganese telluride (CMT), germanium, lanthanum bromide, thorium bromide. Group II-VI semiconductors, and especially those listed, are particularly preferred in this regard. The materials making up the semiconductor are preferably selected from cadmium telluride, cadmium zinc telluride (CZT), cadmium manganese telluride (CMT) and alloys thereof, and for example comprise crystalline $Cd_{1-(a+b)}Mn_aZn_bTe$ where a and/or b may be zero.

Combination of these and any other such materials may be considered which give spectroscopic detection rather than merely detecting amplitude of transmitted radiation.

The use of linear array detectors which confer full spectroscopic information is particularly preferred as, in addition to the inherent advantages of giving compositional information from the spectroscopy, such an ability to identify materials will operate co-operatively with the ability to obtain third dimensional cues via monocular movement parallax to assist further in the resolution of multiple objects, components or image elements in the third dimension.

The basic geometry comprising at least two linear array detectors in serial array, and preferably a plurality of the same, to allow the generation of multiple images and to view these as an animated sequence is fundamental to the invention in providing an enhanced ability to interpret the shape and form of the object.

However, the greatly improved materials identification capability conferred by using spectroscopic linear detectors enhances both the ability inherently to identify composition of objects and the resolvability of different objects in an image via a number of steps which could be additive and reinforcing.

In particular for example spectroscopic detectors can be operated in an energy selective manner, giving rise to the ability to present an image resolved into a significantly increased number of X-ray or other radiation energy bands compared with the two that are available from standard prior art dual energy detectors. This information can be used to provide a much higher degree of material identification than is currently possible and also, by separately identifying objects of different compositions within a composite image, to improve resolvability of such objects.

As an additional effect, the way in which the geometry is arranged with multiple linear detectors arrayed in series across the scanning zone means that each of the ray paths seen by an individual detector is different. Again spectroscopic detectors will be able to gain much more information via these different paths. Some similarity can be seen to the multiple ray path technique used in standard CT technology.

By combining the effects of both the above two aspects of spectroscopic resolution using appropriate algorithms a much more precise interpretation of the type of material being scanned can be achieved.

In their primary mode of operation a laterally spaced series of linear array detectors is configured to receive multiple beams from the source which may for example be from a single X-ray or other radiation source. In a particular embodiment of this mode of operation, one or more sources may be used to generate a series of incident beams and for example curtain beams at relative angles appropriate to the distribution of the separate linear detectors. In this mode of operation, the method and apparatus of the invention may exploit the foregoing advantages.

The geometry also admits an alternative mode of operation. In accordance with this alternative mode of operation a single primary curtain beam is generated, for example directed generally towards a mid-point of the laterally spaced series of linear array detectors, and in particular in the direction of a linear detector at or about the mid-point of the series. The apparatus of the invention preferably includes a suitable collimator to collimate the output of the X-ray source to produce such a primary beam.

With an object in place, this single primary beam is directed towards a central linear detector within the series of detectors. In these circumstances, this detector detects transmitted X-rays, but the other detectors could only be detecting diffracted secondary beams. Subject to appropriate calibration, signals that appeared on the secondary detectors would give additional information concerning scattered X-rays. It is known that scattering is characteristic of polycrystalline materials, which structure is relevant in relation to many of the explosive and like materials that a security detector apparatus might be directed at identifying. Accordingly, in this mode of operation, a significant enhancement of the detectability of such items is offered. This is achieved without the need for secondary scattering detectors but rather by suitable processing of data from the secondary mode of operation.

In a particular preferred embodiment, both modes of operation may be applied sequentially or closely successively or effectively simultaneously to collect maximum information. That is, images may be built up using a single primary beam directed through the full scanning zone created by the linear detectors in the series, and subsequently or closely successively or effectively simultaneously a single collimated primary beam may be directed at an individual linear detector, such as a generally centrally located linear detector in the series, and scatter information collected from the other detectors.

It is a particular advantage of the preferred embodiment, where detectors are used which are capable of resolving information spectroscopically, that the data collected by these two methods can be resolved more readily to give substantial enhancement to the compositional information obtainable by operation of the system.

For operation of the method of the invention it is necessary to cause relative movement between an object to be scanned and the apparatus so as to cause the object to be scanned to move relative to and through the scanning zone. In practice for most practical purposes an object is moved relative to a stationary-scanning zone. For example the apparatus of the invention includes object conveyance means to convey an object to be scanned through a scanning zone. The object conveyance means may for example comprise of planar conveyor, which preferable conveys an object in a plane parallel to a plane in which the series of linear array detectors is disposed. For example, the conveyor is an endless belt conveyor or the like. However it is also valid to have the object remain static and to translate the detector and source to create the relative movement.

The source must produce a distribution of energies. Preferably the source is an X-ray source. Tungsten is the most appropriate target, but others could be used.

One or more of these features of the invention can be combined so as to provide enhanced information for an operator and the specific embodiment discussed below shows such combinations.

BRIEF DESCRIPTION OF THE DRAWINGS

The invention will now be described by way of example, with reference to the accompanying drawings in which.

DETAILED DESCRIPTION OF THE EMBODIMENTS

Figure 1:
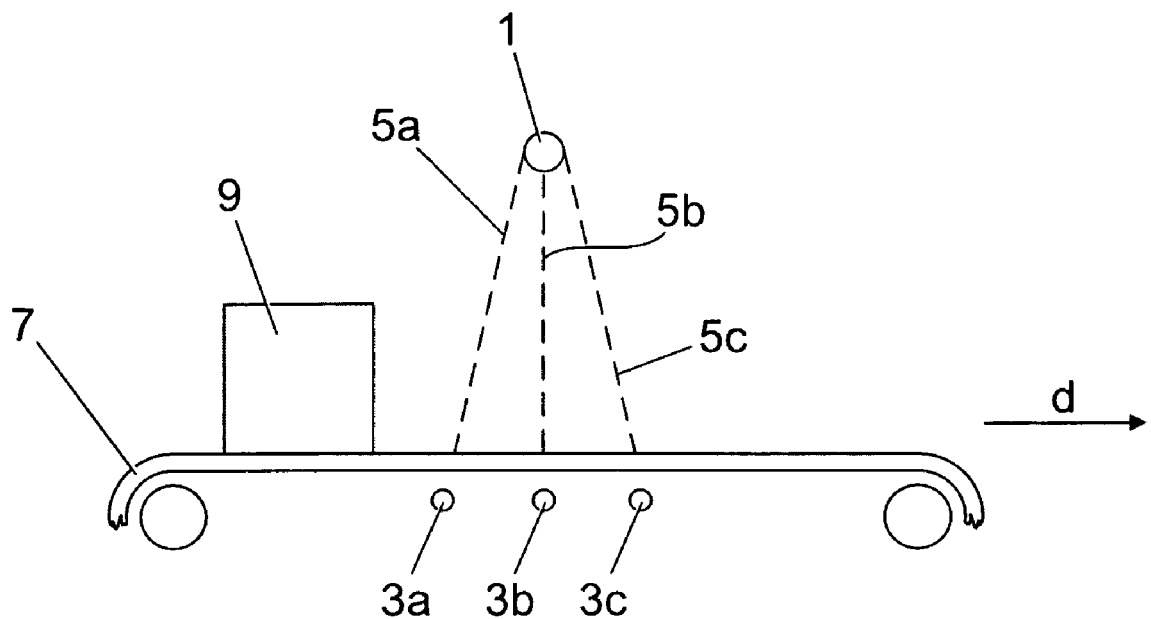
FIG. 1 is a side view of a representation of an embodiment of the invention.

Referring to FIG. 1, a suitable X-ray source 1 is used to direct X-rays via a scanning zone in the direction of three linear array detectors 3a to 3c.

In the embodiment, the linear array detectors 3a to 3c comprise material capable of spectroscopic resolution of incident X-rays, and in the specific example comprise cadmium telluride although the skilled person will appreciate that other material selections may be appropriate. To exploit this spectral resolution, the X-ray source emits X-ray across a broad energy spectrum. In the example a tungsten source is used, although the skilled person would appreciate that other materials might be appropriate.

Incident ray paths 5a to 5c are shown through the scanning zone between the X-ray source 1 and, respectively, the detectors 3a to 3c.

An endless belt conveyor 7 causes an object to be scanned 9 to move in a direction d so as to intercept the ray paths 5a to 5c in the scanning zone. The envisaged application of this embodiment of the invention is as a security scanner, and object 9 can be considered typically to be a container that is expected to contain a variety of distinct objects which it would be useful and desirable to characterise compositionally and to view effectively in a third dimension. However, the skilled person would readily appreciate that the same principles can be applied for example to the scanning of objects for internal examination purposes, to medical scanning, and to similar applications.

Images are generated by building up transmitted information from each of the three detectors 3a to 3c. The image processing system is represented schematically in FIG. 4.

Figure 4:
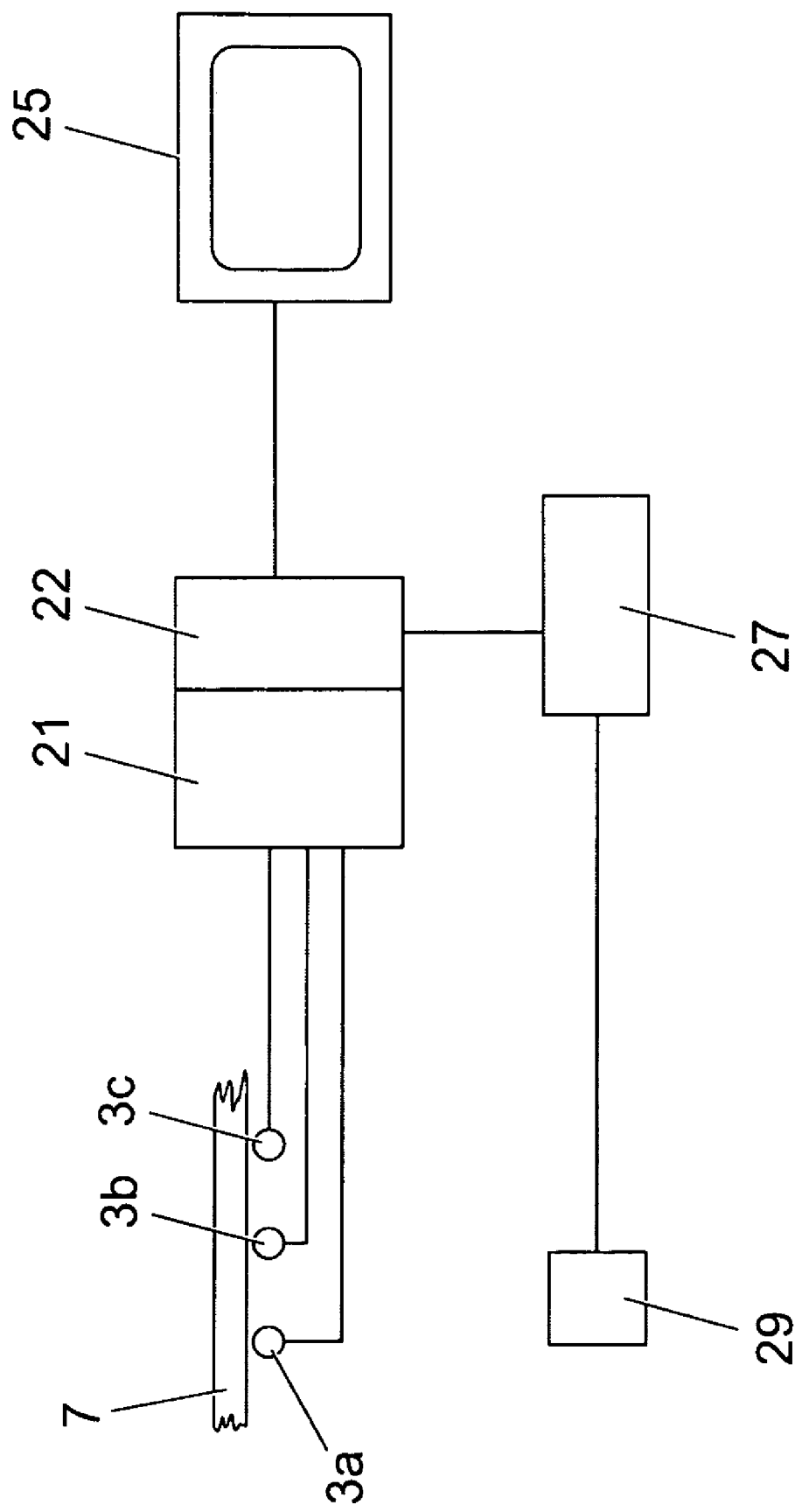
FIG. 4 is a schematic representation of an image processing and display system.

Referring to FIG. 4, as an object passes through the scanning zone data is collected from the three detector arrays 3c to 3c and transmitted to a data collection and processing unit 21 which assembles and collates the data and produces therefore individual images characteristic of the collected data from each detector. These are passed to an image storage register 22.

The data collection and processing unit 21 includes a direct image module and an intermediate image module (not separately identified) for example in the form of suitable processing software. The direct image module generates an image dataset representing the incident information dataset at each of the three detector arrays 3c to 3c. The intermediate image module generates virtual image datsasets based on numerical processing of the incident information datasets of each adjacent pair of detector arrays 3c to 3c. In the illustrated embodiment the intermediate image generator is configured to generate two or more intermediate images from each adjacent pair which show a gradual transition between the direct images produced by each adjacent pair by processing the output of the or each said pair of detectors and generating image representatives of a transition between the two said detected outputs.

The key to the interpretation of the images in the manner envisaged by the invention lies in the way that the images are displayed. A simple display, 25, comprising in this example a two-dimensional video display screen is provided. Images are passed from the image register 22 to be displayed thereon successively and sequentially. The result of this successive sequential display is that an observer viewing the screen 25 is able to glean information from the successive images, and in particular third-dimensional cues, by means of monocular movement parallax between them.

Figure 2A:
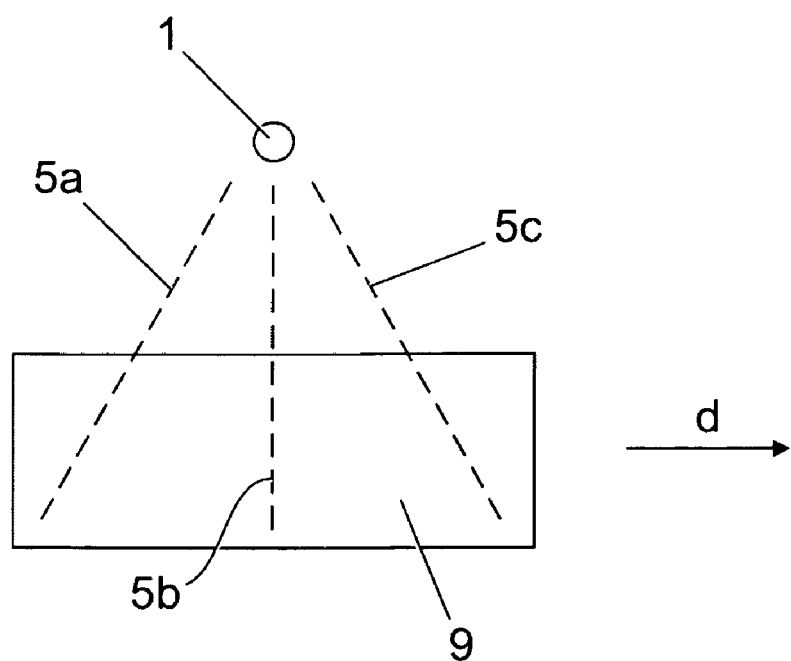
FIG. 2 illustrates the effect created by successive images generated by means of the embodiment of FIG. 1.
Figure 2B:
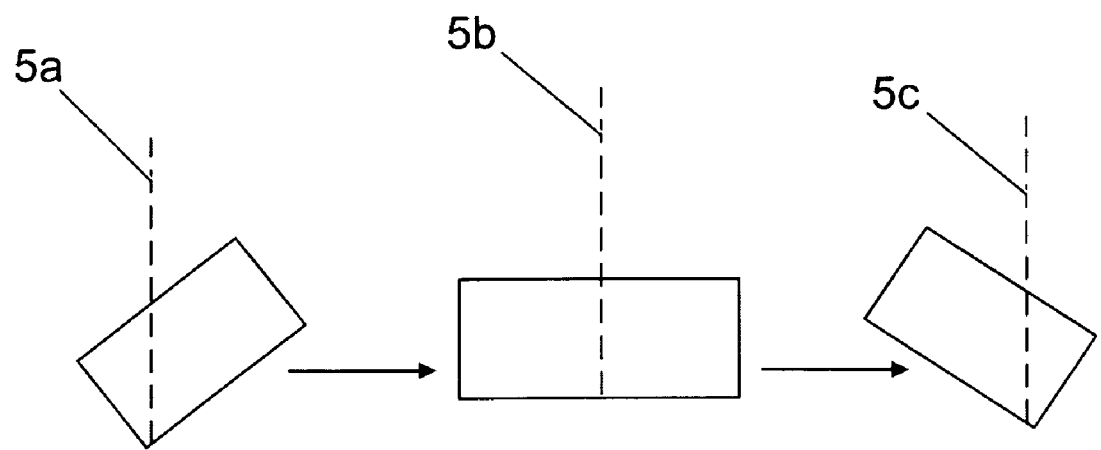

A particular feature of this is illustrated by FIG. 2. As an object 9 passes through incident ray paths 5a to 5c (see FIG. 2a) three images are generated in which the object is oriented differently relative to the X-ray source 1. Successive display of these images will cause the object to appear to rotate about as is illustrated in FIG. 2b.

This ability in effect to get a view of the object which is in effect rotatable in a third dimension can be seen to be analogous to the visual benefits that are seen in a volume rendered CT image. The ability to view objects in pseudo 3D assists the human observer in making correct assumptions about the object in view. The image generated in accordance with the present invention offers these benefits as a result of the multiple ray paths provided by the apparatus, but with a less complex geometry than typical CT machines, and for example may be easily implemented on a simple linear conveyor such as is used in security scanning systems.

FIG. 2 illustrates directly collected images only for clarity. As the embodiment has three detectors, three directly collected images of the object in different positions can be generated. However, in addition to directly obtained images, the image processor 21 is adapted to generate intermediate images by extrapolation of the directly collected data.

In one possible embodiment a single intermediate image is generated for each collective pair. Thus the data register 22 stores five images which can be displayed sequentially. In a second possible embodiment two virtually spaced intermediate images are generated for each collective pair. Thus the data register 22 stores seven images which can be displayed sequentially. Other array and intermediate image protocols may be applied.

Thus, the data collection and processing unit 21 in the illustrated embodiment generates at least seven images from only three detectors. Thus the data register 22 stores at least seven images which can be displayed sequentially. Other array and intermediate image protocols may be applied, subject to the underlying principle that six or more images representing real or virtual position shifts and thus with relative movement parallax are generated by five or fewer detectors.

The sequential display of images on the screen 25 is under user control by the control means 27. This allows a user to generate animated sequences from the succession of images stored in the data register 22, and effectively to manipulate the collection of images to gain significant third dimensional cues from the collected data. Optionally to further enhance this the control means 27 includes a means to control a belt drive 29 which acts to operate the conveyor belt 7 allowing the object itself to be passed and re-passed through the scanning zone in cases of uncertainty.

In the illustrated embodiment, detectors are used which are capable of resolving the transmitted X-rays spectroscopically. This resolved spectroscopic information forms part of the data that is subsequently processed to provide materials identification of the objects in the image.

The particular advantages of the present invention over more complex stereoscopic systems are well illustrated by FIGS. 1 and 4. No particular stereoscopic viewing apparatus is required, but merely a two-dimensional screen 25. The geometry of the system lends itself simply to a belt conveyance apparatus, and thus the system of the present invention requires little fundamental change in the basic apparatus features or method of use when compared with a conventional X-ray scanner. However, it offers a significant ability to enhance both object resolution in three dimensions and material characterisation, in particular thanks to the effect illustrated in FIG. 2.

Figure 3:
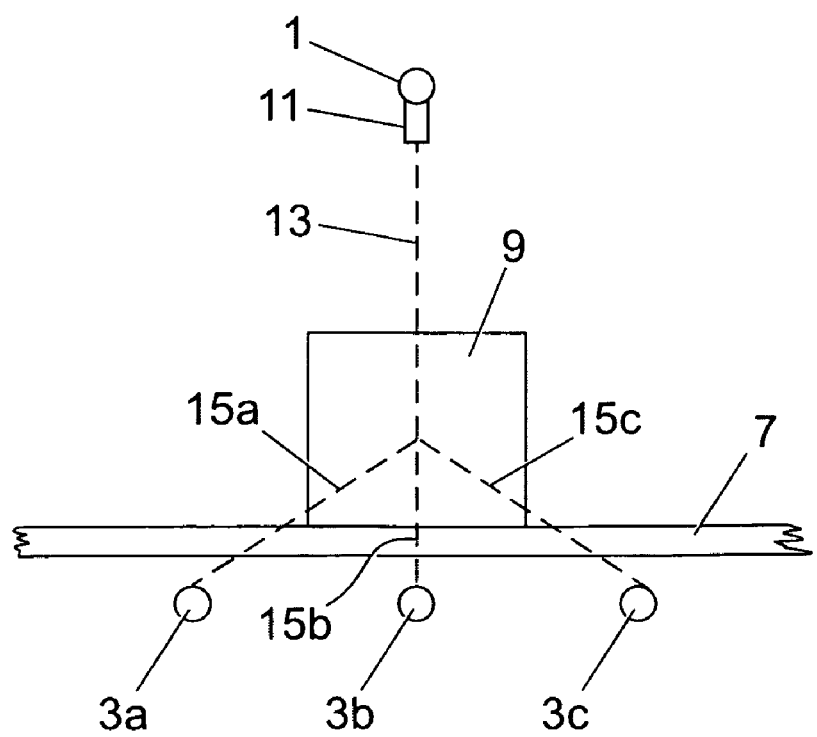
FIG. 3 is a side view of the embodiment of the invention in an alternative mode of operation.

FIG. 3 represents an alternative mode of operation for the scanner, and is illustrated with an object 9 in position in a scanning zone.

The X-ray source 1 has its output collimated into a single curtain beam 13 by a collimator 11. The single path beam is directed at the middle detector 3b. The middle detector 3b receives transmitted X-ray via the ray path 15b. The other detectors 3a and 3c receive scattered X-rays via the respective ray paths 15a and 15c. Thus, the apparatus of the invention can readily be adapted via this mode of operation to detect both transmitted and scattered X-ray simultaneously, and to make use of the information derivable therefrom to characterise polycrystalline materials. Separate scatter detectors are not required. The resolution of transmitted and scattered X-rays is assisted in the embodiment by the spectroscopic resolution conferred by the cadmium telluride detectors.

Data from the mode of operation represented in FIG. 3 can be collected and processed alongside data from the mode of operation represented in FIG. 1 in the manner represented schematically in FIG. 4. For example, the two modes of operation may be operated sequentially, closely successively or simultaneously to provide enhanced characterisation information for the composition of imaged objects.

In accordance with the example embodiment three linear array detectors are illustrated in series. It would be understood that even a pair of detectors would generate a pair of images from which monocular movement parallax could be obtained, and that in a practical system it might well be desirable to have a larger plurality of detectors in series. Three detectors are presented by way of illustration only. Nevertheless, an effective manipulatable and animatable image series can be obtained from a relatively small number of linear detectors in series, especially if suitable algorithms are used within the imaging system to generate intermediate images from collected data.

The invention claimed is:

1. An apparatus for generating and displaying an image of an object comprising:
   a radiation source and a series of at least two and no more than five linear radiation detectors spaced therefrom to define a scanning zone therebetween;
   means to cause an object to move relative to and through the scanning zone in use;
   a direct image generation apparatus configured to generate an image from the output of at least one linear detector;
   an intermediate image generation apparatus configured to generate at least one intermediate image from at least one adjacent pair of linear detectors, by processing the output of said pair of detectors and generating an image representative of an output intermediate between the two said detector outputs;
   the direct and intermediate image generation apparatus adapted such that at least five images are generated in total;
   an image display adapted to successively display the images and monocular movement parallax between the images.

2. An apparatus in accordance with claim 1 wherein the linear detectors making up the laterally spaced series are arranged such that the distance between them changes in order to maintain a constant angular separation between each array.

3. An apparatus in accordance with claim 2 further comprising alignment means to allow for alignment of each linear detector.

4. An apparatus in accordance with claim 1 the apparatus comprises a collimator adapted to allow a user to select two to five beams from a single radiation source.

5. An apparatus in accordance with claim 1 comprising a laterally spaced series of at least three but no more than five linear detectors and an image generation apparatus adapted to generate a series of at least six images for successive display.

6. An apparatus in accordance with claim 1 wherein the image display is a monocular display adapted to successively display images as individual two-dimensional images.

7. An apparatus in accordance with claim 6 wherein the image display is a two dimensional video display screen.

8. An apparatus in accordance with claim 1 wherein the intermediate image generation apparatus is configured to generate two or more intermediate images from at least one adjacent pair of detectors which show a gradual transition between the images produced by the adjacent pair of detectors by processing the output of the pair of detectors and generating image representatives of a transition between the two said detected outputs.

9. An apparatus in accordance with claim 1 further comprising control means to enable a user to display successive images at variable speeds in order to enable a smooth transition for a human observer between each image and/or in a forward and reverse order.

10. An apparatus in accordance with claim 1 wherein each linear detector in the laterally spaced series comprises a linear array of photodiode cells.

11. An apparatus in accordance with claim 1 wherein at least some of the linear detectors comprise dual energy detectors.

12. An apparatus in accordance with claim 1 wherein at least some of the linear detectors comprise detectors configured to generate spectroscopic information about transmitted radiation, in that the detector exhibits a spectroscopically variable response across at least a substantial part of a source spectrum allowing spectroscopic information to be retrieved.

13. An apparatus in accordance with claim 12 including image processing means adapted to represent spectroscopic resolution of the source spectrum in the generated image.

14. An apparatus in accordance with claim 13 wherein the image processing means is adapted to process the spectroscopically resolved data into a plurality of bands and apply different colors to represent each such band in the generated image.

15. An apparatus in accordance with claim 12 wherein the linear detector is fabricated from a material selected to exhibit a direct variable photoelectric response to different parts of the source spectrum.

16. An apparatus in accordance with claim 15 wherein the detector comprises a material or materials selected from a group consisting of cadmium telluride, cadmium zinc telluride (CZT), cadmium manganese telluride (CMT), germanium, lanthanum bromide, and thorium bromide.

17. An apparatus in accordance with claim 1 wherein the means to cause an object to move relative to and through the scanning zone comprises an object conveyance means in the form of a planar conveyor to convey an object through a scanning zone defined by a static source and detector array.

18. An apparatus in accordance with claim 1 comprising an X-ray source and at least two and no more than five linear radiation detectors spaced therefrom.

19. An apparatus in accordance with claim 18 comprising a tungsten X-ray source.

20. A method of obtaining an image of an object comprising the steps of:
providing a radiation source and a series of at least two and no more than five linear radiation detectors spaced therefrom to define a scanning zone therebetween;
causing an object to move relative to and through the scanning zone;
generating a direct image from the output of at least one linear detector;
generating at least one intermediate image from at least one adjacent pair of linear detectors, by processing the output of said pair of detectors and generating an image representative of an output intermediate between the two said detector outputs;
such that at least five images are generated in total;
displaying such images successively and thus displaying a monocular movement parallax between the images.

21. A method in accordance with claim 20 wherein the images are displayed successively as individual two-dimensional images.

22. A method in accordance with claim 20 wherein a laterally spaced series of at least three but no more than five linear detectors is provided to generate a series of at least six images for successive display.

23. A method in accordance with claim 20 wherein the method comprises generating at least two intermediate images from at least one adjacent pair, and where applicable generating at least one intermediate image from a plurality of linear detectors, by processing the output of the or each said pair of detectors and generating an image representative of an output intermediate between the two said detected outputs.

24. A method in accordance with claim 20 wherein the successive images are displayed at custom definable refresh rates and directions under observer control to facilitate interpretation.

25. A method in accordance with claim 20 wherein images generated by at least some of the linear detectors are resolved into two energy bands.

26. A method in accordance with claim 20 wherein images generated by at least some of the linear detectors are resolved spectroscopically across at least a substantial part of a source spectrum, and spectroscopic resolution of transmitted radiation obtained from the output of each such linear detector is represented in the displayed image.

27. A method in accordance with claim 26 wherein a banded mapping is used to represent spectroscopic resolution in the generated image in that the source spectrum is divided into a plurality of bands and different colours are used to represent each such band in the displayed image.

28. A method in accordance with claim 20 further comprising the steps of:
in a first mode of operation, generating a plurality of images from a laterally spaced series of linear arrays of detectors in the manner of claim 20; and
further in a second mode of operation, generating a single collimated primary curtain beam, directed at a particular linear detector within the series of detectors,
using the other detectors to detect diffracted secondary beams,
processing this information from the other detectors to give additional information concerning scattered radiation.

29. A method in accordance with claim 28 wherein both modes of operation are applied sequentially or closely successively or effectively simultaneously.

30. A method of in accordance with claim 20 comprising providing an X-ray radiation source and a series of at least two and no more than five linear X-ray detectors.

* * * * *